United States Patent

Anderson et al.

[11] Patent Number: 6,019,294
[45] Date of Patent: Feb. 1, 2000

[54] INTERCHANGEABLE FEED AIRSPRAY/ HVLP SPRAY GUN

[75] Inventors: Richard D. Anderson, Maple Grove; John R. Simonds, Bloomington; Ken C. Floer, Crystal, all of Minn.

[73] Assignee: Graco Inc, Minneapolis, Minn.

[21] Appl. No.: 09/081,341

[22] Filed: May 19, 1998

Related U.S. Application Data

[60] Provisional application No. 60/047,631, May 23, 1997.

[51] Int. Cl.[7] ........................................ B05B 7/30
[52] U.S. Cl. ........................ 239/302; 239/318; 239/375
[58] Field of Search .................... 239/302, 346, 239/379, 417, 526, 318

[56] References Cited

U.S. PATENT DOCUMENTS

| | | | |
|---|---|---|---|
| 1,777,650 | 10/1930 | Paasche | 239/379 X |
| 2,101,938 | 12/1937 | Giberson | 285/9 |
| 2,465,495 | 3/1949 | Taliento | 285/97 |
| 2,497,625 | 2/1950 | Norwick | 299/140 |
| 2,499,659 | 3/1950 | Lockwood | 285/97 |
| 2,757,048 | 7/1956 | Balmer . | |
| 2,805,086 | 9/1957 | Shumaker | 285/134 |
| 3,236,459 | 2/1966 | McRitchie | 239/379 X |
| 4,360,186 | 11/1982 | Tinsley et al. | 251/1 |
| 4,560,109 | 12/1985 | Teruyuki et al. | 239/583 |
| 4,619,403 | 10/1986 | Goldney et al. | 239/456 |
| 5,052,432 | 10/1991 | Vonalt et al. | 137/355 |
| 5,102,051 | 4/1992 | Smith et al. | 239/297 |
| 5,183,322 | 2/1993 | Haruch | 239/394 |
| 5,226,677 | 7/1993 | Peter et al. | 285/11 |
| 5,267,693 | 12/1993 | Dickey | 239/417 |
| 5,332,159 | 7/1994 | Grime et al. | 239/412 |
| 5,344,074 | 9/1994 | Spriggs et al. | 239/10 |
| 5,364,033 | 11/1994 | Cedoz et al. | 239/526 |
| 5,366,158 | 11/1994 | Robisch et al. | 239/346 X |
| 5,395,046 | 3/1995 | Knobbe et al. | 239/3 |

*Primary Examiner*—Lesley D. Morris
*Attorney, Agent, or Firm*—Douglas B. Farrow

[57] ABSTRACT

A spray gun is easily convertible between a number of configurations. A removable fluid insert may be placed in interchangeable (airspray and HVLP) spray heads with the fluid insert being either a pressure fed device which depends downwardly from the front end of the gun into a pressurized cup or via a connection to a pressurized fluid source or may have an upwardly directed insert which will take fluid from a gravity cup. A simple air swivel also adds ergonomic benefits.

3 Claims, 4 Drawing Sheets

INTERCHANGEABLE FEED AIRSPRAY/ HVLP SPRAY GUN

RELATED APPLICATIONS

This application is a continuation-in-part of U.S. application Ser. No. 60/047,631, filed May 23, 1997.

BACKGROUND OF THE INVENTION

Air spray and HVLP (high volume low pressure) spray guns have been a popular way to apply paint and other coatings over the years. While conversion between various configurations has been possible with some models, such conversion has typically been expensive, difficult and/or performance compromising.

SUMMARY OF THE INVENTION

It is therefore an object of this invention to provide a spray gun which is easily converted between airspray and HVLP configurations as well as between pressure and gravity fed configurations.

It is another object of this invention to provide a spray gun which swivels easily on an air hose.

A spray gun which may be either a conventional air spray gun or the HVLP variant of an air spray gun is designed with a number of features to enhance its ergonomics and general ease of use.

A unique air swivel design is utilized which provides an upper fitting which threads into the bottom thread inlet of the gun air seal on a chamfer cut. This fitting houses two guide bushings and a u-cup air seal. An inner stem passes through the guide bushings and seals at the top bushing radius slip and threads into the bottom air hose connection fitting. A compression spring provides the force to push the lower fitting down to swivel stability and to push the stem lip against the upper bushing for air sealing. The bottom fitting and stem can be pushed up or tilted slightly within the small gap to upper fitting with no loss of air leakage. The spring creates a light force allowing a low swivel drag and concurrent ease of use by the operator. The entire assembly requires only 7 simple parts which are easy to manufacture.

As part of this ease of use issue a number of features contribute towards its success. First of all the gun is easily convertible between a number of configurations. A removable fluid insert may be placed in interchangeable spray heads with the fluid insert being either a pressure fed device which depends downwardly from the front end of the gun into a pressurized cup or via a connection to a pressurized fluid source or may have an upwardly directed insert which will take fluid from a gravity cup.

The interchangeable spray head assemblies may be used for conventional air spray or HVLP with the HVLP spray head having restricted air passages to assure that the proper restricted air pressure is present at the front end of the spray gun in order to meet HVLP standards. This interchangeability and reconfiguration ability is easily accomplished in that the fluid insert slides into the spray head which is then inserted through the depending annular member on the front of the gun body and threaded into place with a nut.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

DESCRIPTION OF THE PREFERRED EMBODIMENT

Figure 1:
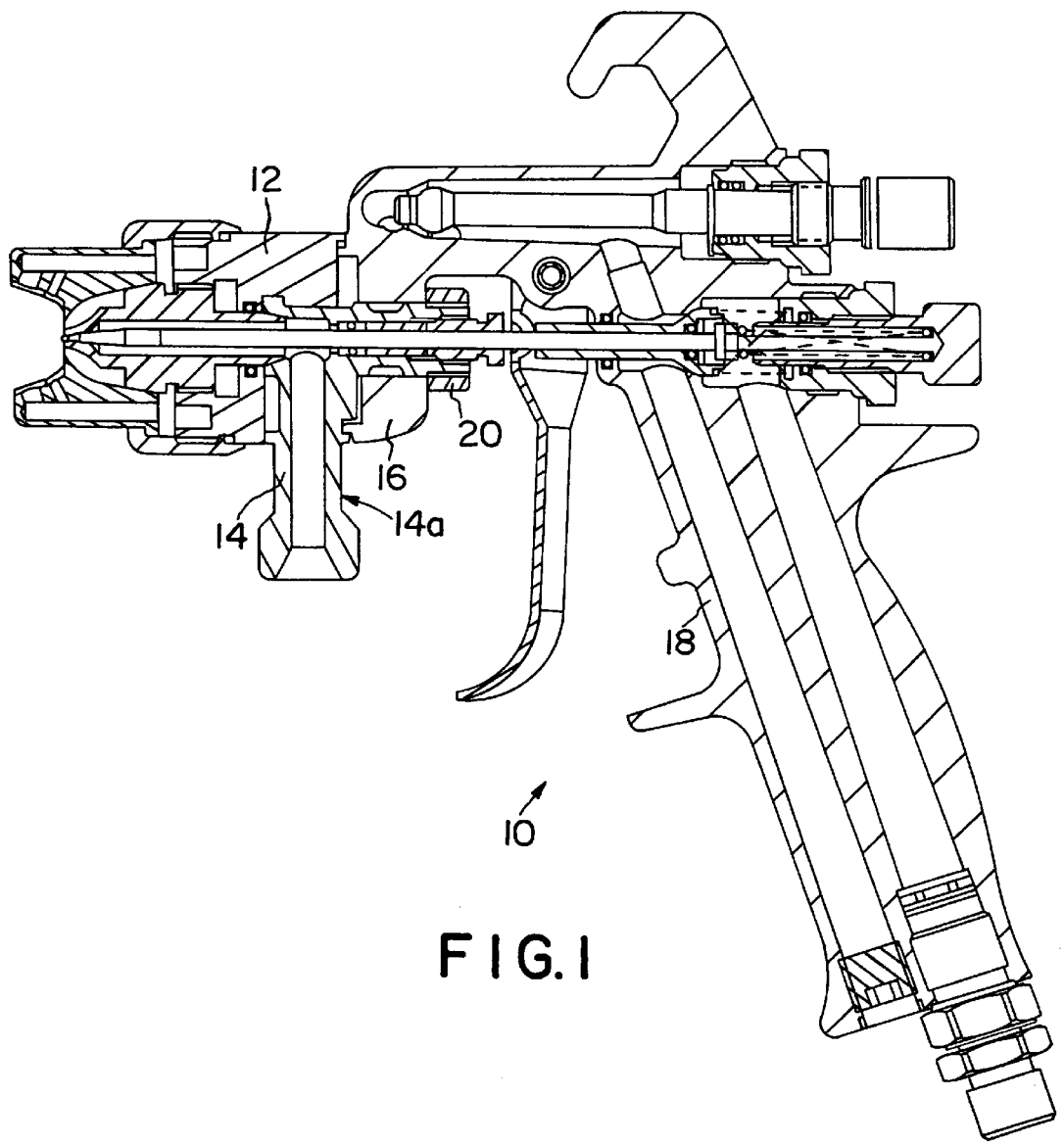
FIG. 1 is a cross-sectional view of the spray gun of the instant invention for use with a pressurized cup.
Figure 2:
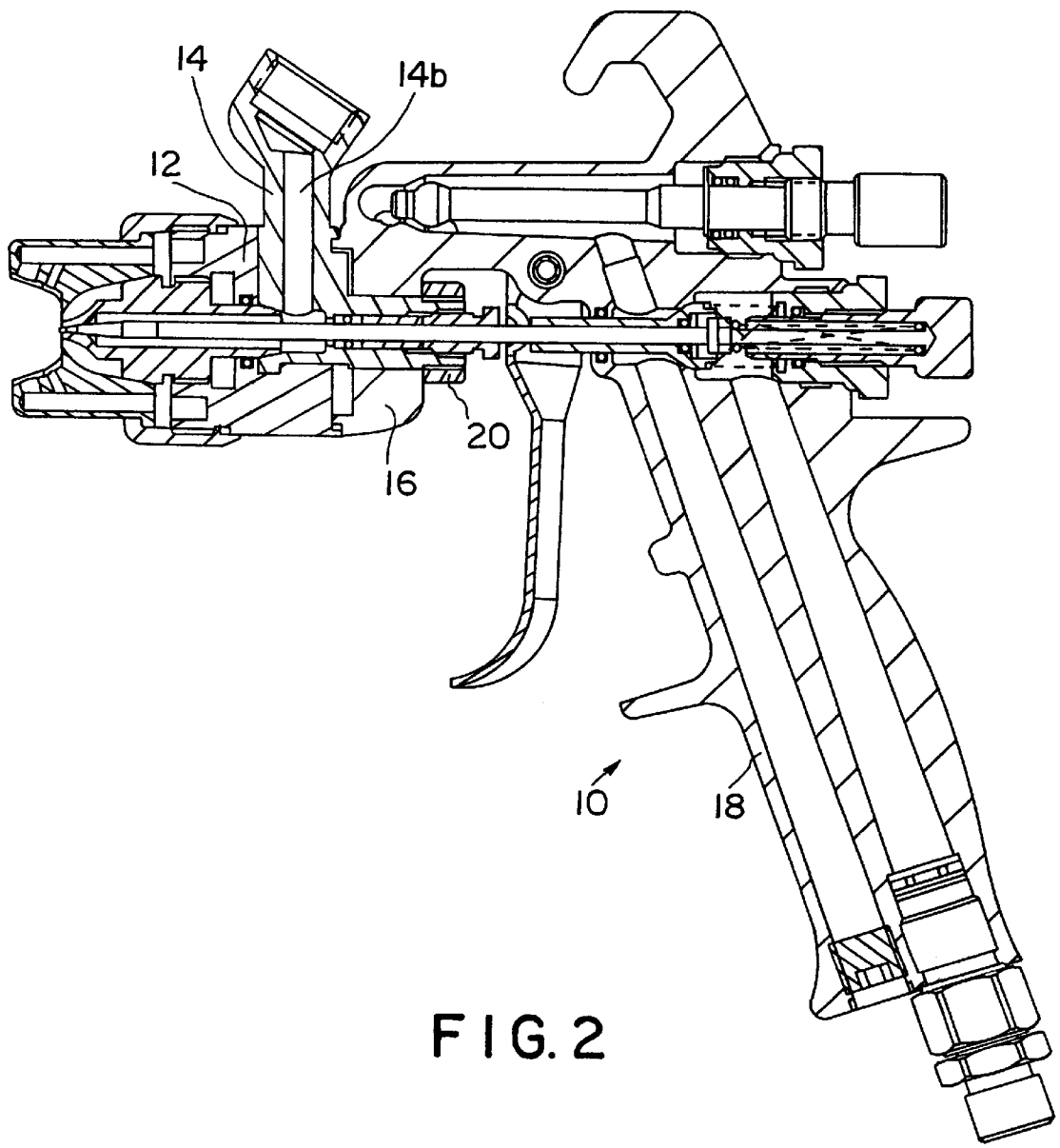
FIG. 2 is a cross-sectional view of the spray gun of the instant invention for use with a gravity feed cup.
Figure 3:
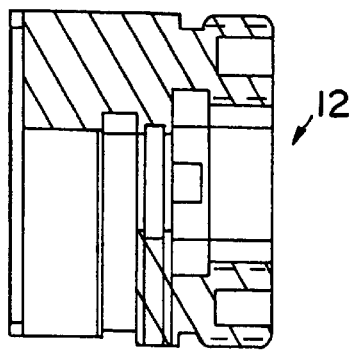
FIG. 3 is a cross-sectional view of the spray head of the instant invention.
Figure 4:
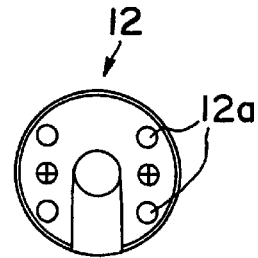
FIG. 4 is an end view of the spray head of the instant invention.
Figure 5:
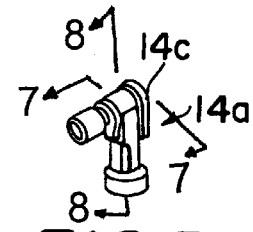
FIG. 5 is a perspective view of the pressurized cup fluid insert of the instant invention.
Figure 6:
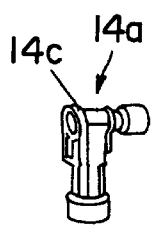
FIG. 6 is another perspective view of the pressurized cup fluid insert of the instant invention.
Figure 7:
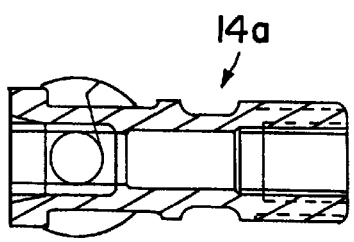
FIG. 7 is a cross-sectional view of the pressurized cup fluid insert of the instant invention taken along line 7—7 of FIG. 5.
Figure 8:
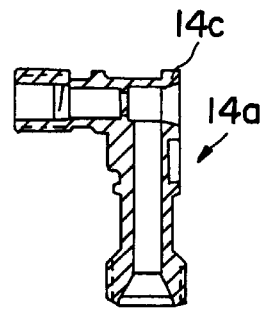
FIG. 8 is a cross-sectional view of the pressurized cup fluid insert of the instant invention taken along line 8—8 of FIG. 5.
Figure 9:
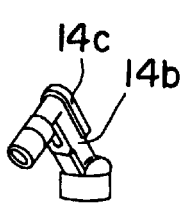
FIG. 9 is a perspective view of the gravity feed fluid insert of the instant invention.
Figure 10:
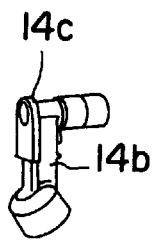
FIG. 10 is another perspective view of the gravity feed fluid insert of the instant invention.
Figure 11:
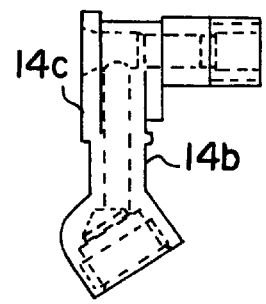
FIG. 11 is a side plan view of the gravity feed fluid insert of the instant invention.
Figure 12:
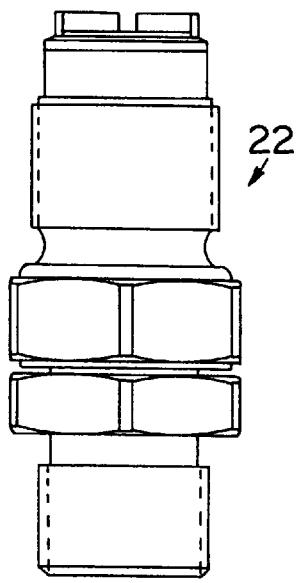
FIG. 12 is a side plan view of the swivel of the instant invention.
Figure 13:
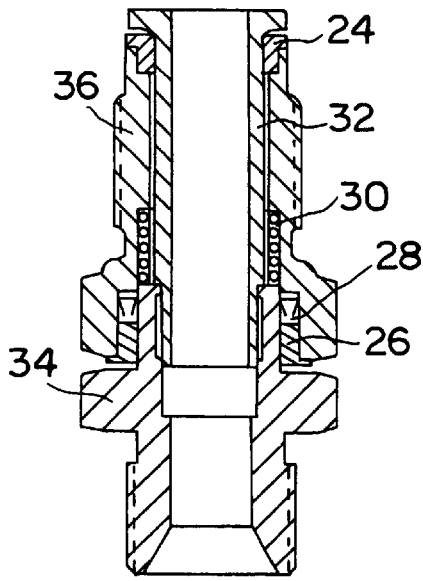
FIG. 13 is a cross-sectional view of the swivel of the instant invention.

A spray gun 10 which may be either a conventional air spray gun or the HVLP variant of an air spray gun is shown generally in FIGS. 1 and 2.

As part of this ease of use issue a number of features contribute towards its success. First of all the gun is easily convertible between a number of configurations. A removable fluid insert 14 may be placed in interchangeable spray heads 12 with the fluid insert 14 being either a pressure fed device 14a which depends downwardly from the front end of the gun into a pressurized cup or via a connection to a pressurized fluid source (FIG. 1) or may have an upwardly directed insert 14b which will take fluid from a gravity cup (FIG. 2).

The interchangeable spray head assemblies 12 may be used for conventional air spray or HVLP with the HVLP spray head having restricted air passages 12a to assure that the proper restricted air pressure is present at the front end of the spray gun in order to meet HVLP standards. This interchangeability and reconfiguration ability is easily accomplished in that the fluid insert 14 radially slides into the spray head 12 guided by flange 14c which is then inserted through the depending annular member 16 on the front of the gun body 18 and threaded into place with a nut 20. Spray head 12 is merely rotated 180° and secured depending on which insert is desired for spraying.

A unique air swivel design 22 is utilized which provides an upper fitting 36 which threads into the bottom thread inlet of the gun air seal on a chamfer cut. This fitting houses two guide bushings 24 and 26 and a u-cup air seal 28. An inner stem 32 passes through the guide bushings and seals at the top bushing radius slip and threads into the bottom air hose connection fitting 34. A compression spring 30 provides the force to push the lower fitting down to swivel stability and to push the stem lip against the upper bushing for air sealing.

The bottom fitting and stem can be pushed up or tilted slightly within the small gap to upper fitting with no loss of air leakage. The spring creates a light force allowing a low swivel drag and concurrent ease of use by the operator. The entire assembly requires only seven simple parts which are easy to manufacture.

It is contemplated that various changes and modifications may be made to the spray gun without departing from the spirit and scope of the invention as defined by the following claims.

What is claimed is:

1. An air atomizing fluid spray gun designed for interchangeable use between gravity feed and pressure feed, said spray gun comprising:

a trigger;

a body comprising a boss having first and second sides, said boss first side facing said trigger;

a needle, said needle being controlled by said trigger and extending through said boss;

a spray head attachable to said boss and rotatable between first and second generally diametrically opposed positions; and a fluid insert radially insertable into said spray head.

2. The fluid spray gun of claim 1 further wherein said spray head comprises air passages.

3. The fluid spray gun of claim 2 further wherein said spray head air passages are restricted to make said spray gun and HVLP gun.

* * * * *